United States Patent
Khemet et al.

(10) Patent No.: US 8,024,978 B2
(45) Date of Patent: Sep. 27, 2011

(54) MEDIA ISOLATED PRESSURE TRANSDUCER HAVING BOSS COMPRISING SINGLE METAL DIAPHRAGM

(75) Inventors: Bomani A. Khemet, Columbus, OH (US); Marsha Martin, Columbus, OH (US)

(73) Assignee: Honeywell International Inc., Morristown, NJ (US)

( * ) Notice: Subject to any disclaimer, the term of this patent is extended or adjusted under 35 U.S.C. 154(b) by 282 days.

(21) Appl. No.: 12/346,295

(22) Filed: Jan. 21, 2009

(65) Prior Publication Data

US 2010/0180688 A1  Jul. 22, 2010

(51) Int. Cl.
*G01L 9/06* (2006.01)

(52) U.S. Cl. ............................. 73/727; 73/715

(58) Field of Classification Search ............... None
See application file for complete search history.

(56) References Cited

U.S. PATENT DOCUMENTS

| | | | |
|---|---|---|---|
| 5,883,419 A * | 3/1999 | Lee et al. | 257/417 |
| 5,932,809 A * | 8/1999 | Sparks et al. | 73/727 |
| 6,093,579 A | 7/2000 | Sathe | |
| 6,465,271 B1 * | 10/2002 | Ko et al. | 438/48 |
| 7,204,162 B2 * | 4/2007 | Johnson et al. | 73/862.628 |
| 7,538,470 B2 * | 5/2009 | Sarkar | 310/306 |
| 7,575,940 B2 * | 8/2009 | Hwang et al. | 438/3 |
| 7,624,644 B2 * | 12/2009 | Fujioka | 73/725 |

* cited by examiner

*Primary Examiner* — Lisa M Caputo
*Assistant Examiner* — Jermaine Jenkins
(74) *Attorney, Agent, or Firm* — Seager, Tufte & Wickhem LLC (57) ABSTRACT

A pressure sensor for sensing a pressure of a fluid includes a monolithic metal including substrate having a substantially planar top side, wherein the metallic comprising substrate includes s a relatively thick boss near a center of the substrate and a thinned sensing portion that is elastically deformable and pressure-sensitive positioned radially outward from the boss. At least one dielectric layer is on the top side of the substrate. A plurality of piezoresistors are on the dielectric layer, wherein the piezoresistors are positioned over the thinned diaphragm portion. At least one overglaze layer is over the conductor layer that provides apertures for electrically contacting the plurality of piezoresistors. A sensing system includes a housing including at least a first port for coupling to a fluid for measurement of a pressure of the fluid and at least one sensor in the housing including a pressure sensor according to an embodiment of the invention.

20 Claims, 5 Drawing Sheets

MEDIA ISOLATED PRESSURE TRANSDUCER HAVING BOSS COMPRISING SINGLE METAL DIAPHRAGM

TECHNICAL FIELD

Embodiments of the invention relate to pressure transducers, more particularly pressure transducers comprising metal comprising diaphragms and strain sensors and thick film processing and packaging for the transducers.

BACKGROUND

Pressure transducers can measure the pressure differential between two adjacent volumes. The respective volumes can contain a fluid, such as a liquid or gas, with each volume's fluid being at a pressure. The pressure differential is the difference in pressure between the fluids in the adjacent volumes. Conventional pressure transducers often employ one or more silicon strain sensors in proximity to a silicon diaphragm. The diaphragm separates the two volumes and the pressure differential causes the diaphragm to flex. The flexure can be sensed as strain by the strain sensors and the signal from the strain signal interpreted as a measurement of the pressure differential. The fluid pressure in one of the volumes can be set to a known pressure quantity such that the measurement can be interpreted as an absolute pressure measurement.

Some fluids can dissolve, corrode, or otherwise interact with silicon and its corresponding die attach adhesive and/or bonding agent. Special precautions must be taken to prevent such fluids from contacting the silicon strain sensors or the silicon diaphragm. As such, these systems have limited applications. Systems and methods for sensing pressure in harsh environments are needed.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims. Embodiments of the present invention describe.

Embodiments of the invention provide pressure sensors for sensing a pressure of a fluid. The pressure sensors generally comprise a monolithic metal including substrate having a substantially planar top side, wherein the metallic comprising substrate includes a relatively thick boss near a center of the substrate and a thinned sensing portion that is elastically deformable and pressure-sensitive positioned radially outward from the boss. At least one dielectric layer is on the top side of the substrate. A plurality of piezoresistors are on the dielectric layer, wherein the piezoresistors are positioned over the thinned diaphragm portion. At least one overglaze layer is over the conductor layer that provides apertures for electrically contacting the plurality of piezoresistors.

The substrate can comprise nickel comprising steel. The dielectric layer can be molecularly bonded to the top side of the substrate. In one embodiment of the invention, the boss is at least 5 times a minimum thickness of the thinned sensing portion, and the thinned sensing portion is $\leq 0.5$ mm.

The substrate generally includes an inner cavity comprising volume on a side opposite the top side of the substrate. The sensor can further comprise an electrical conductor layer comprising a plurality of bond pads electrically coupled to the plurality of piezoresistors.

In another embodiment of the invention, a sensing system is described. The sensing system comprises a housing including at least a first port for coupling to a fluid for measurement of a pressure of the fluid and at least one sensor in the housing including a pressure sensor according to an embodiment of the invention for sensing pressure of the fluid. The system can further comprise an end cap, wherein the pressure sensor is secured to the end cap, and the end cap is secured to the housing to form a hermetically sealed sensor system that prevents the fluid from reaching the topside of the substrate. The system can further comprise a configurable electrical circuit in the housing electrically coupled to the plurality of piezoresistors. In another embodiment the sensing system further comprises at least one thermistor in the housing for sensing a temperature of the fluid. The housing can further comprise a second port for providing a reference pressure to allow determination of a pressure differential between the first port and the second port. The sensing system can also further comprise an electrical conductor layer including a plurality of bond pads electrically coupled to the plurality of piezoresistors.

BRIEF DESCRIPTION OF THE DRAWINGS

FIG. 11A-N illustrate exemplary steps and related depictions for an exemplary method of assembling a sensing system including a housing and a media isolated pressure sensor in the housing comprising a transducer having boss comprising single metal diaphragm and optional temperature sensor comprising a thermistor.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1A:
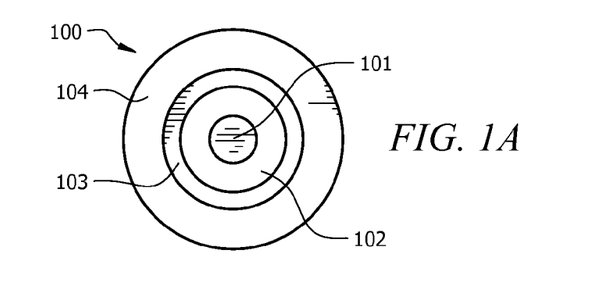
FIGS. 1A and 1B each illustrate cross sectional views of a boss comprising single (integral) metallic diaphragm comprising assembly according to an embodiment of the invention.
Figure 1B:
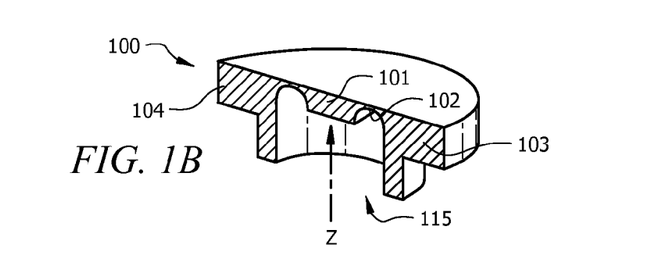

FIGS. 1A and B each illustrate a pair of cross sectional views of a boss comprising single (integral) metallic diaphragm comprising assembly 100 in accordance with a first embodiment of the present invention. Assembly 100 comprises boss a relatively thick boss 101 near the center and a thinned sensing portion 102 that is elastically deformable and pressure-sensitive positioned radially outward from boss 101. Boundary portion 103 bounds thinned sensing portion 102. Boundary portion 103 is shown extending in the z direction to form an inner cavity comprising volume 115 which as described below provides a path for the fluid to have its pressure and optionally its temperature to be measured reach the thinned sensing portion 102 of assembly 100. Assembly 100 also includes outer flange region 104, which as described below is used for sealing the diaphragm comprising assembly 100. The top surface of the assembly 100 is essentially planar. This top surface is used as a substrate to form layers thereon as described below.

The boss 101 is generally from 3-6 mm which is generally $\geq 10$ times the minimum thickness of the thinned sensing portion 102 which generally $\leq 0.5$ mm, such as 0.1-0.2 mm. The thinned sensing portion 102 is fabricated to be thin enough to be elastically deformable and thus flex when subjected to a pressure differential across, such as 10 to 100 PSI up to about 5,000 PSI.

The metallic material for assembly 100 is generally resistant to most harsh conditions, including harsh chemicals to enable adaptation for sensing pressure and optionally temperature in harsh environments. Exemplary metallic materials for assembly 100 include materials such as certain steels, generally being nickel comprising steels, including Hastelloy C22 CW™, Hastelloy C22™, Haynes-214™, Inconel 718™, A 286™, Kanthal-A™, Kanthal-D™, 17-4PH™ or 430 Stainless Steel, many of which are alloys. Those practiced in the arts of metallurgy or advanced thick film (ATF) processing are familiar with Hastelloy C22 CW™, Hastelloy C22™, Haynes-214™, Inconel 718™, A 286™, Kanthal-A™, Kanthal-D™, 17-4PH™ and 430 Stainless Steel.

The assembly 100 can be formed by several methods. For example, assembly 100 can be machined from bar stock. Alternatively, assembly 100 can be formed by injection molding using a suitable mold.

Figure 2:
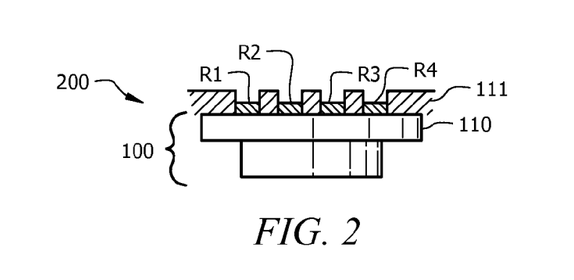
FIG. 2 illustrates a cross sectional view of a boss comprising a metallic diaphragm comprising assembly, a dielectric layer thereon, and a plurality of piezoresistive elements (piezoresistors) on the dielectric layer over the thinned sensing portion of the assembly, according to an embodiment of the invention.

FIG. 2 illustrates a cross sectional view of a boss comprising sensor stack 200 according to an embodiment of the invention. Sensor stack 200 comprises a metallic diaphragm assembly 100 having a boss 101 and thinned sensing portion 102 (as shown in FIGS. 1A and 1B). A dielectric layer 110 is on the assembly 100. Piezoresistors shown as R1, R2, R3 and R4 are on the dielectric layer 110. The piezoresistors R1-R4 are positioned over the thinned sensing portion 102 of the assembly 100. An overglaze layer 111 is over the piezoresistors R1-R4 but includes apertures to allow electrical contact to the piezoresistors R1-R4. The stack 200 is generally formed using ATF technology which involves forming stacks comprising a plurality of thick film layers using solvent comprising mixtures followed by high temperature firing including sintering. The layers can comprise layers of thick-film conductors and dielectrics such as ceramics. ATF processing generally provides molecularly bonding between respective layers. Furthermore, the materials utilized via the ATF process thereof can exhibit strong adhesion to the assembly 100 after firing and thus become very resistant to thermal stress. An example of an ATF process is disclosed in U.S. Pat. No. 4,794,048 entitled, "Ceramic Coated Metal Substrates for Electronic Applications," which issued to Oboodi et al on Dec. 28, 1988, and which is incorporated herein by reference for its ATF teaching. Another example of an ATF process is disclosed in U.S. Pat. No. 4,997,698 entitled "Ceramic Coated Metal Substrates for Electronic Applications," which is also issued to Oboodi et al on Mar. 5, 1991, and which is also incorporated herein by reference for its ATF teaching.

Although a single dielectric layer 110 is shown in FIG. 2, the stack can include a plurality of dielectric layers. The dielectric layer(s) can be deposited on the metallic substrate using a number of techniques such as printing, evaporative deposition, chemical deposition, or lamination. Heraeus SD 2000™ and Honeywell Z2Zr™ are examples of dielectric materials that can be used as dielectric layers. Heraeus SD 2000™ and Honeywell Z2Zr™ are known to those practiced in the arts of dielectrics or ATF processing.

Figure 3:
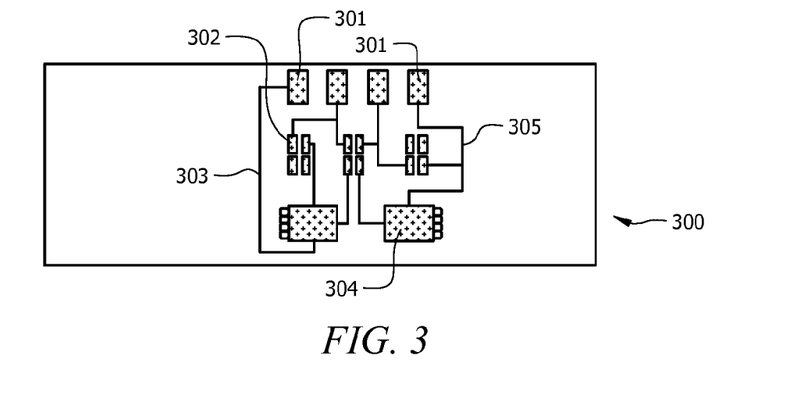
FIG. 3 illustrates an exemplary patterned conductor layer according to an embodiment of the invention.

FIG. 3 illustrates an exemplary patterned electrical conductor layer 300 according to an embodiment of the invention. The electrical conductor layer 300 has a plurality of bond pads 301 and a wire pattern made of a number of wire network traces 303, 305. The wire network traces 303, 305 have component pads 302 for electrical connection to components such as resistors, transistors, and capacitors. Electrical conductor layer 300 also includes sensor pads 304.

Figure 4:
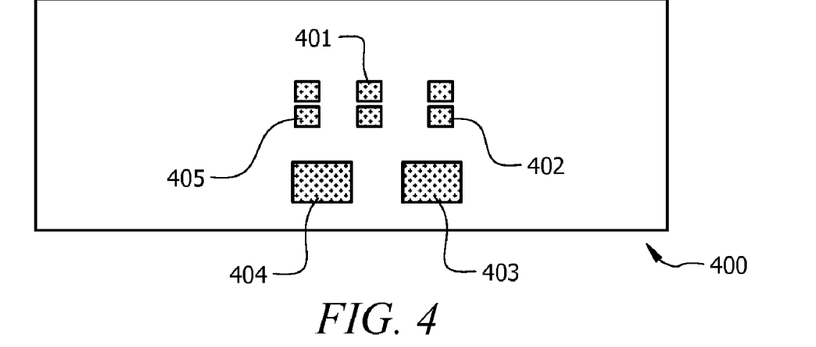
FIG. 4 illustrates an exemplary patterned component layer according to an embodiment of the invention.

FIG. 4 illustrates an exemplary patterned component layer 400 according to an embodiment of the invention. The components can comprise one or more resistors 405, transistors 401, capacitors 402, and sensors 403, 404. Resistors 405 can be printed directly over the conductor layer 300, can be attached by an electrically conductive adhesive or solder, or can be produced by a lithographic process. Certain resistors such as piezoresistors are sensitive to stress such that the resistor's conductance changes when the resistor is flexed. Resistors printed directly onto the conductor layer 300 can be particularly sensitive to flex induced stress and can thereby be used as strain sensors. As known in the art, the resistors 405 can be arranged and electrically connected by the wire networks 303 and 305 to form a Wheatstone bridge. Those familiar with electric circuits are familiar with using Wheatstone bridges to detect small changes in resistance.

Figure 5:
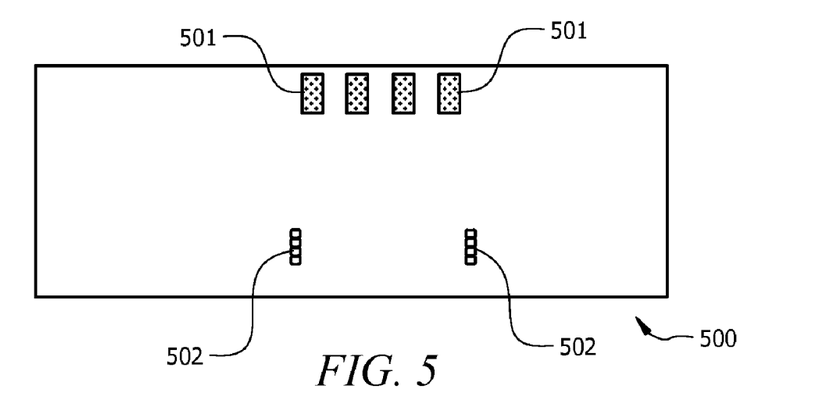
FIG. 5 illustrates an exemplary patterned overglaze layer according to an embodiment of the invention.

FIG. 5 illustrates an exemplary patterned overglaze layer 500 according to an embodiment of the invention. The overglaze layer 500 protects the other layers from the environment, which in certain applications can be corrosive. Apertures 501, 502 in the overglaze layer 500 provide access for electrical connection to portions of the electrical conductor layer 300 and/or the component layer 400. For example, external circuits can be attached to the bond pads 301 shown in FIG. 3 through apertures 501 in the overglaze layer 500.

Figure 6:
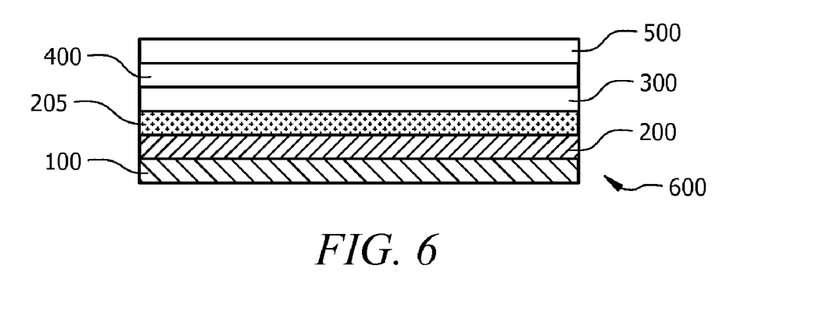
FIG. 6 illustrates an exemplary advanced thick film (ATF) stack according to an embodiment of the invention.

FIG. 6 illustrates an exemplary ATF stack 600 according to an embodiment of the invention. The stack 600 comprises a metallic substrate 100, such as provided by assembly 100 described above. A first and second dielectric layer 200 and 205 are shown on top of the metallic substrate 100. An electrical conductor layer 300 is shown on top of the dielectric layers 200. A component layer 400 is on top of the electrical conductor layer 300. Finally, an overglaze layer 500 overlies all the other layers. An ATF stack 600 can be used as an ATF differential pressure transducer because the ATF stack 600 is thin enough to flex when subjected to a pressure differential and because the components, such as printed on resistors, function as strain sensors as they a formed from a material is has an electrical conductance that is sensitive to the flexure.

Figure 7:
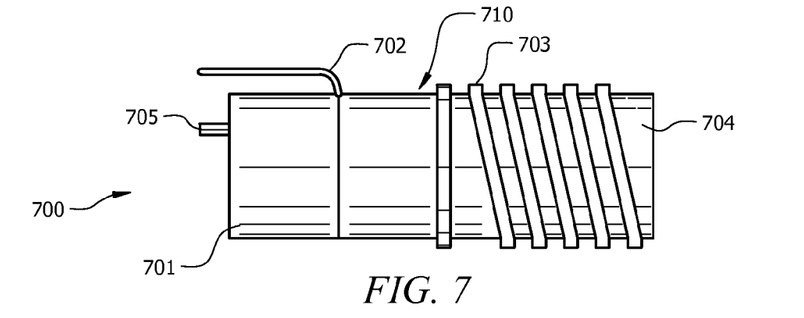
FIG. 7 illustrates an exemplary ATF differential pressure transducer package according to an embodiment of the invention.

FIG. 7 illustrates an exemplary ATF differential pressure transducer package according to an embodiment of the invention. A housing 700 has a cap end 701 and an attachment end 704. The housing can comprise metal or plastic, both generally being corrosion resistant materials. The cap end 701 has a fluid flow port 705 through which a fluid can reach the ATF differential pressure transducer inside the housing 700. The attachment end 704 has threads 703 such that the housing can be screwed into a fixture. A wiring cable 702 is shown exiting the housing 700 between the cap end 701 and the attachment end 704. The wiring cable comprises a plurality of wires that can be attached to the bond pads, such as bond pads 301 shown in FIG. 3. Some embodiments of the invention do not have the wiring cable 702 because, in those embodiments, external circuits access the ATF differential pressure transducer through pins in the attachment end 704.

Figure 8:
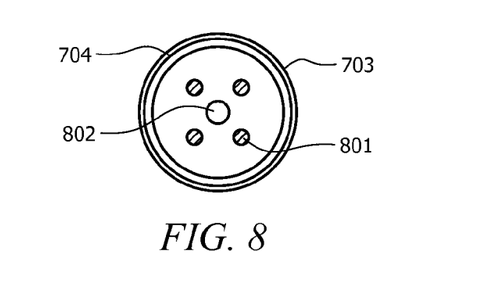
FIG. 8 illustrates an end view of an exemplary ATF differential pressure transducer package according to an embodiment of the invention.

FIG. 8 illustrates an end view of an exemplary ATF differential pressure transducer package according to an embodiment of the invention. The view shown is from the outside looking directly into the attachment end 704. Four output pins 801 provide external circuits with access to the enclosed ATF differential pressure transducer. A port 802 allows a fluid to reach one side of the enclosed ATF differential pressure transducer and thus create a pressure differential across thinned sensing portion 102 of assembly 100. A different port 705 (shown in FIG. 7) provides access to the other side, such as to provide a reference pressure. As such, the differential pressure can be measured.

Figure 9:
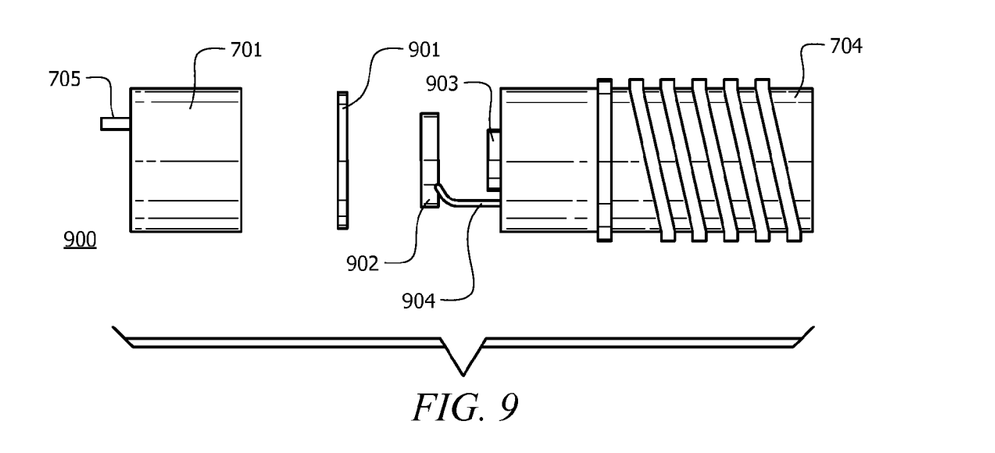
FIG. 9 illustrates an exploded view of an exemplary ATF differential pressure transducer package according to an embodiment of the invention.

FIG. 9 illustrates an exploded view of an exemplary ATF differential pressure transducer package 900 according to an embodiment of the invention. The ATF differential pressure transducer 902 can be seen along with a wiring cable 904 that connects it to the pins 801. The ATF differential pressure transducer 902 can be attached to a port ring 903 through which port 802 passes. An O-ring 901 can help seal the cap end 701 to the attachment end 704.

The ATF differential pressure transducer 902 produces an electrical sensor signal. A suitable conversion module can convert the sensor signal into an output signal. For example, the sensor signal can be a voltage between 0 volts and 1 volt. The output signal can be a voltage ranging between plus and minus 12 volts, an electrical current, a modulated sinusoid, or even a LVDS (low voltage differential signal). The conversion module allows a standard ATF differential pressure transducer 902 to be used in a standard housing while still customizing the package output to a customer's specifications. The ATF differential pressure transducer 902 can be attached to a port ring 903 through which port 802 passes. The O-ring 901 can help seal a port 705 to the ATF differential pressure transducer 902.

Figure 10:
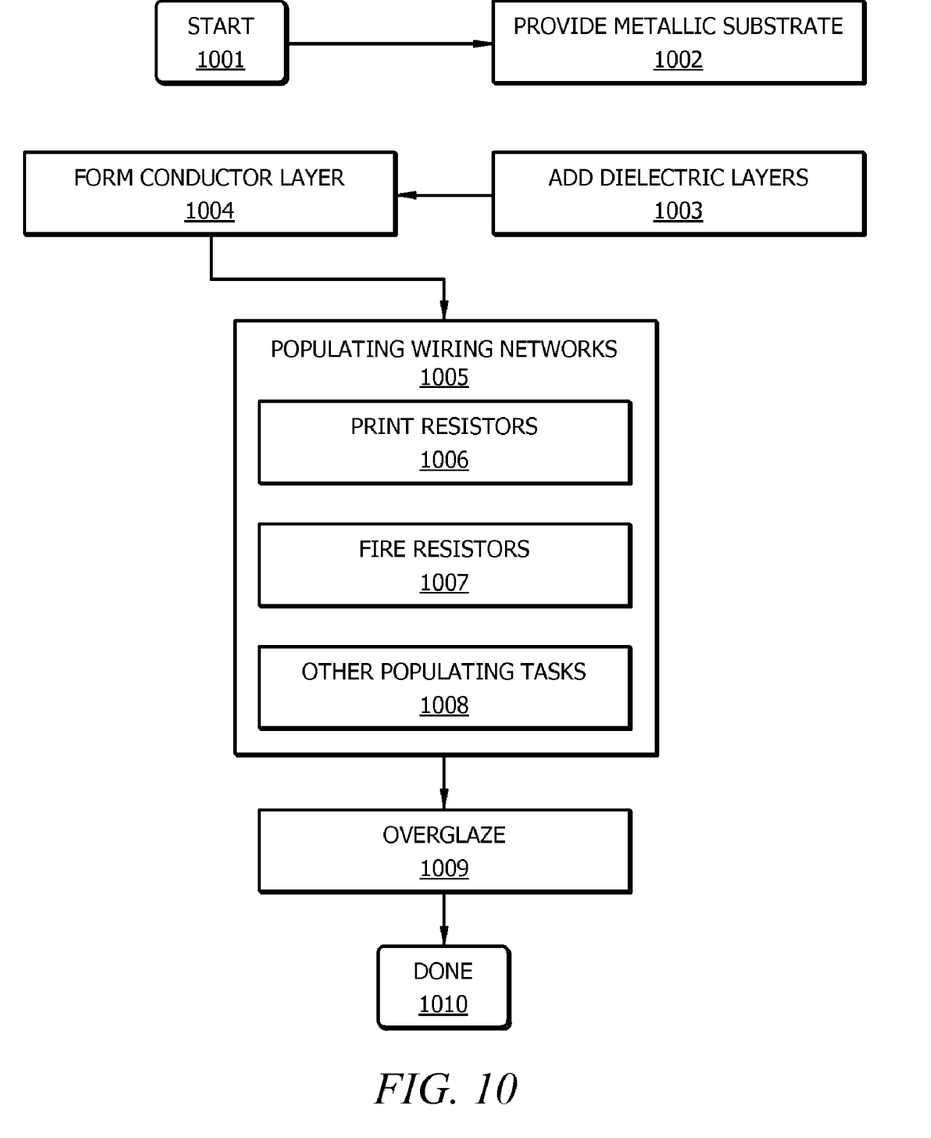
FIG. 10 illustrates a high level flow diagram of producing an exemplary ATF differential pressure transducer according to an embodiment of the invention.

FIG. 10 illustrates an exemplary high level flow diagram of producing an ATF differential pressure transducer according to an embodiment of the invention. After the start 1001 a metallic substrate is provided 1002 upon which an ATF stack is formed. The metallic substrate comprises a boss comprising a single (integral) metallic diaphragm, such as assembly 100 shown in FIGS. 1A and 1B comprising a relatively thick boss 101 near the center and a thinned sensing portion 102 that is elastically deformable and pressure-sensitive positioned radially outward from boss 101. As described above, diaphragm comprising assemblies such as assembly 100 can be formed by machining or molding. In step 1003, one or more dielectric layers are formed on the essentially planar top side of the metallic substrate. An electrical conductor layer is then formed in step 1004 on the dielectric layer. The conductor layer can be formed by printing a conductive pattern, lithography, or in some other manner. Next, the wiring networks of the conductor layer are populated in step 1005. Populating the resistors can include the steps of printing the resistors (e.g. piezoresistors) 1006 onto the conductor layer and then firing to fix the resistors in step 1007.

Other populating tasks 1008, such as attaching transistors, capacitors or conventional resistors can also occur. The transistors, capacitors or resistors can be discreet circuit elements that can be used to filter or amplify the output of a transducer or sensing circuit. As described above, stress sensitive resistors arranged as a Wheatstone bridge provide a sensing circuit for detecting flexure and thence differential pressure. Overglaze provided by overglazing step 1009 provides a protective layer on top of the other layers before the process is done in step 1010.

Figure 11:
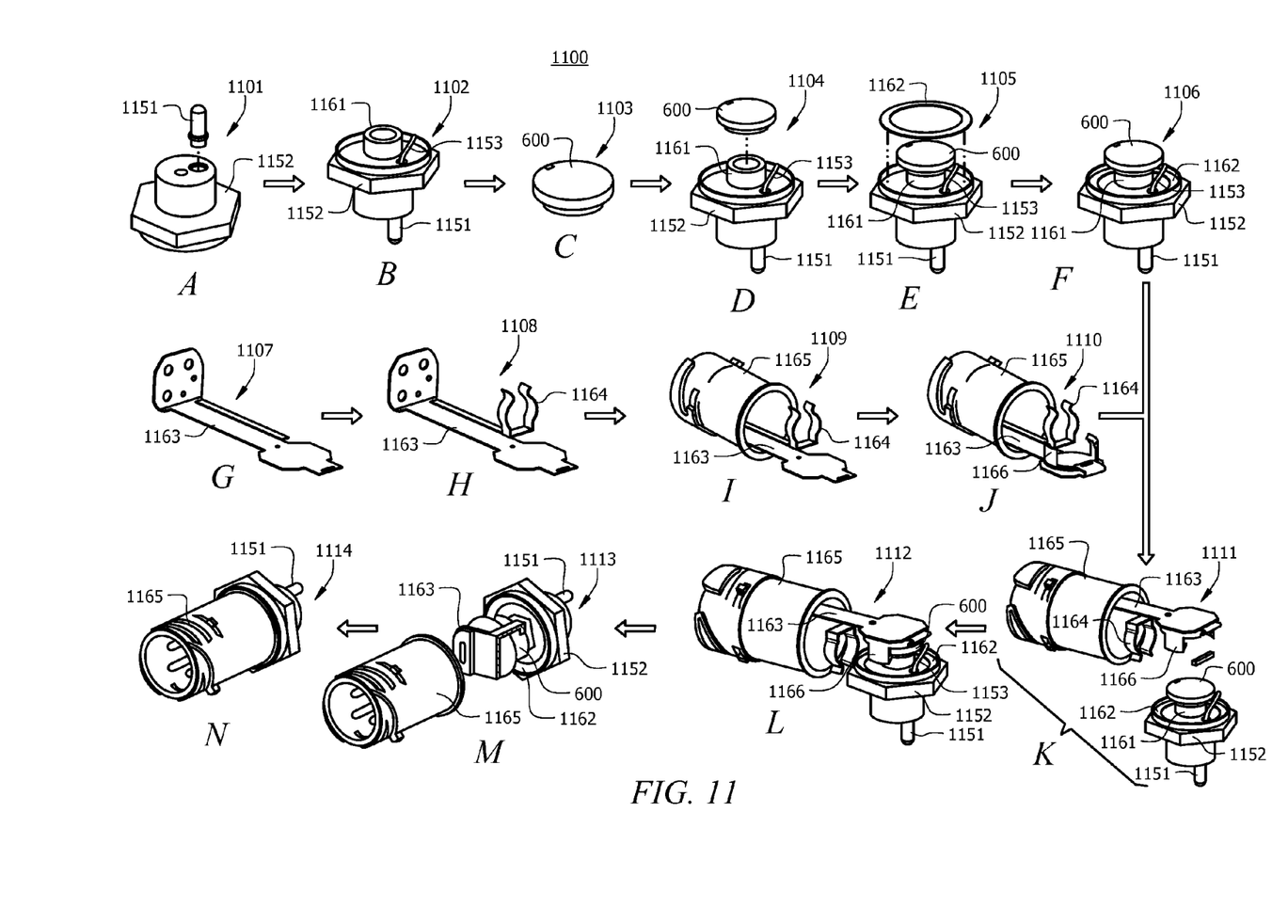

FIG. 11A-N illustrate exemplary steps and related depictions for a method 1100 of assembling a sensing system including a housing and a media isolated pressure sensor in the housing comprising a transducer having a boss comprising single metal diaphragm and optional temperature sensor comprising a thermistor. Step 1101 shown in FIG. 1A comprises welding a port 1151 to an end cap 1152 that includes a Thermistor well. Step 1102 shown in FIG. 1B comprises potting a thermistor 1153 into the Thermistor well. Pressure port 1161 is shown. Step 1103 shown in FIG. 1C comprises providing an ATF stack 600 that includes a diaphragm comprising assembly, such as assembly 100 shown in FIG. 1. In step 1104 shown in FIG. 1D the ATF stack is joined (e.g. welded) to the pressure port 1161 to create a hermetical seal so that fluid (which may be corrosive) to be measured reaching diaphragm comprising assembly 100 does not reach the topside of the diaphragm comprising assembly 100 and other downstream components as described below. Step 1105 shown in FIG. 1E comprises installing a gasket seal 1162 to provide the port-diaphragm assembly of FIG. 1F that corresponds to 1106.

Steps 1107-1110 shown in FIGS. 1G-H respectively comprise configuring a housing having a flex circuit (not shown) mounted on a connector 1165 therein. Step 1107 Populating a flex assembly with desired flex circuitry which as known in the art is configurable electrical circuitry. Step 1108 comprises soldering an electrostastic discharge (ESD) clip to the flex circuit 1163. Step 1109 comprises soldering the flex circuitry 1163 to the Connector 1165. Step 1110 comprises heat staking a snap cap 1166 to the flex circuit 1163.

Step 1111 shown in FIG. 1K comprises inserting a z-axis conductor. The z-axis connector provides the electrical contact between the full Wheatstone bridge on stack 600 to the flex circuit 1163. Step 1112 shown in FIG. 1L comprises attaching the snap cap 1166 to the ATF stack 600 and soldering the leads of the thermistor 1153 to the flex assembly on the connector 1163. Step 1113 shown in FIG. 1M comprises attaching the ESD clip 1164 to port, to ground the flex to end cap 1152. Finally, in step 1114 shown in FIG. 1N the end cap 1152 is sealed to the housing, such as by crimping.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A pressure sensor for sensing a pressure of a fluid, comprising:
   a monolithic substrate comprising metal and further having a substantially planar top side, wherein said substrate comprises a boss near a center of said substrate and a thinned sensing portion that is elastically deformable and pressure-sensitive positioned radially outward from said boss; and
   an ATF stack formed directly on said top side of said substrate, said ATF stack including:
      at least one dielectric film deposited on said top side of said substrate;
      a plurality of piezoresistors on said dielectric layer, wherein said piezoresistors are positioned over said thinned sensing portion of said substrate;
      a conductor layer forming a wire pattern; and
      at least one overglaze layer that provides apertures for electrically connecting to said plurality of piezoresistors via said wire pattern.

2. The sensor of claim 1, wherein said substrate comprises a nickel and steel combination.

3. The sensor of claim 1, wherein said dielectric layer is deposited and molecularly bonded to said top side of said substrate.

4. The sensor of claim 1, wherein said boss is at least 5 times a minimum thickness of said thinned sensing portion, and said thinned sensing portion is ≦0.5 mm.

5. The sensor of claim 1, wherein said substrate includes an inner cavity comprising volume on a side opposite said top side of said substrate.

6. The sensor of claim 1, wherein the conductor layer comprises a plurality of bond pads electrically coupled to said plurality of piezoresistors.

7. The sensor of claim 1, wherein said dielectric layer comprises a ceramic.

8. A sensing system, comprising:
   a housing including at least a first port for coupling to a fluid for measurement of a pressure of said fluid;
   at least one sensor in said housing including a pressure sensor for sensing pressure of said fluid, said sensor pressure comprising:
      a monolithic substrate comprising metal and further having a substantially planar top side, wherein said substrate comprises a relatively thick boss near a center of said substrate and a thinned sensing portion that is elastically deformable and pressure-sensitive radially outward from said boss;
      at least one dielectric layer on said top side of said substrate;
      a plurality of piezoresistors on said dielectric layer, wherein said piezoresistors are positioned over said thinned diaphragm portion;
      at least one overglaze layer that provides apertures for electrically connecting to said plurality of piezoresistors; and
   an end cap;
   wherein said pressure sensor is secured to said end cap, and said end cap is secured to said housing to form a hermetically sealed sensor system that prevents said fluid from reaching said topside of said of said substrate.

9. The sensing system of claim 8, further comprising a configurable electrical circuit in said housing electrically coupled to said plurality of piezoresistors.

10. The sensing system of claim 8, further comprising at least one thermistor in said housing for sensing a temperature of said fluid.

11. The sensing system of claim 8, wherein said housing further comprises a second port for providing a reference pressure to allow determination of a pressure differential between said first port and said second port.

12. The sensing system of claim 8, further comprising an electrical conductor layer including a plurality of bond pads electrically coupled to said plurality of piezoresistors.

13. The sensing system of claim 12, wherein said conductor layer further comprises a wire pattern comprising at least two wires for coupling said plurality of piezoresistors to said plurality of bond pads.

14. The sensor of claim 8, wherein said substrate comprises a nickel and steel combination.

15. The sensor of claim 8, wherein said dielectric layer is molecularly bonded to said top side of said substrate.

16. The sensor of claim 8, wherein said boss is at least 5 times a minimum thickness of said thinned sensing portion, and said thinned sensing portion is ≦0.5 mm.

17. A method of making a pressure sensor, comprising:
   providing a metal containing substrate having a substantially planar top surface, said substrate comprising a boss near a center of said substrate and a thinned sensing portion that is elastically deformable and pressure-sensitive positioned radially outward from said boss;
   forming an ATF stack directly on said top surface of said substrate, including the steps of:
      forming one or more dielectric layers on said top surface of said substrate;

forming an electrical conductive layer including a wiring network; and forming piezoresistors, some of which being in electrical communication with said wiring network.

18. The method of claim 17, further comprising forming a protective overglaze layer substantially on top of said one or more dielectric layers, said electrical conductive layer, and said piezoresistors.

19. The method of claim 17, wherein forming one or more dielectric layers includes depositing the one or more dielectric layers by one or more of the processes of printing, evaporative deposition, chemical deposition, and/or lamination.

20. The method of claim 17, wherein forming piezoresistors includes printing piezoresistors.

* * * * *